(12) United States Patent
Adaszewski et al.

(10) Patent No.: US 10,540,743 B2
(45) Date of Patent: Jan. 21, 2020

(54) TWO-DIMENSIONAL PIECEWISE APPROXIMATION TO COMPRESS IMAGE WARPING FIELDS

(71) Applicant: North Inc., Kitchener (CA)

(72) Inventors: Stanislaw Adaszewski, Lausanne (CH); Patrick McGlew, Romainmotier (CH)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 16/290,201

(22) Filed: Mar. 1, 2019

(65) Prior Publication Data

US 2019/0266700 A1   Aug. 29, 2019

Related U.S. Application Data

(63) Continuation of application No. 14/977,469, filed on Dec. 21, 2015, now abandoned.

(51) Int. Cl.
| | | |
|---|---|---|
| *G06T 3/00* | (2006.01) | |
| *H04N 9/31* | (2006.01) | |
| *G02B 27/01* | (2006.01) | |
| *G06T 7/20* | (2017.01) | |
| *G06T 19/00* | (2011.01) | |

(52) U.S. Cl.
CPC ........ *G06T 3/0093* (2013.01); *G02B 27/0101* (2013.01); *G02B 27/0103* (2013.01); *G06T 7/20* (2013.01); *G06T 19/006* (2013.01); *H04N 9/3108* (2013.01); *H04N 9/3179* (2013.01); *H04N 9/3185* (2013.01); *G02B 2027/011* (2013.01)

(58) Field of Classification Search
None
See application file for complete search history.

(56) References Cited

U.S. PATENT DOCUMENTS

| | | | | |
|---|---|---|---|---|
| 6,222,593 B1* | 4/2001 | Higurashi | .............. | G03B 37/04 315/368.12 |
| 6,735,015 B1* | 5/2004 | Blackham | .......... | G02B 27/0101 348/121 |
| 6,793,350 B1* | 9/2004 | Raskar | ................... | G03B 37/04 353/121 |
| 6,804,406 B1* | 10/2004 | Chen | ..................... | G06T 3/4038 345/1.3 |
| 8,125,406 B1* | 2/2012 | Jensen | ................. | G02B 27/017 345/7 |
| 8,542,250 B2* | 9/2013 | Baseley | ................. | G06T 19/00 345/633 |
| 2003/0043303 A1* | 3/2003 | Karuta | ............... | G02B 27/0025 348/744 |
| 2003/0052837 A1* | 3/2003 | Raskar | ..................... | H04N 9/12 345/32 |
| 2004/0156558 A1* | 8/2004 | Kim | ...................... | G06T 3/0081 382/276 |
| 2004/0184010 A1* | 9/2004 | Raskar | .................. | G03B 37/04 353/94 |

(Continued)

*Primary Examiner* — Jason A Pringle-Parker
(74) *Attorney, Agent, or Firm* — Thomas Mahon

(57) ABSTRACT

Techniques to pre-warp an image based on an image warping map comprising a number of cells where each cell corresponds to a polynomial approximation for a number of corresponding pixels to be warped are described. An image warping map can be generated by partitioning a per pixel warping map into cells and approximating the pixel movements of each cell with a polynomial function.

14 Claims, 16 Drawing Sheets

(56) References Cited

U.S. PATENT DOCUMENTS

| | | | | |
|---|---|---|---|---|
| 2004/0184013 A1* | 9/2004 | Raskar | ............... | G03B 37/04 |
| | | | | 353/121 |
| 2004/0257435 A1* | 12/2004 | Clinton | ............... | G09F 19/12 |
| | | | | 348/36 |
| 2005/0083402 A1* | 4/2005 | Klose | ............... | H04N 9/3147 |
| | | | | 348/52 |
| 2007/0291051 A1* | 12/2007 | Brown | ............... | G02B 26/0816 |
| | | | | 345/647 |
| 2008/0095468 A1* | 4/2008 | Klemmer | ............ | H04N 9/3147 |
| | | | | 382/285 |
| 2008/0112058 A1* | 5/2008 | Matsushita | ........ | G02B 27/0101 |
| | | | | 359/630 |
| 2010/0188587 A1* | 7/2010 | Ashley | ............... | G06F 3/0346 |
| | | | | 348/744 |
| 2010/0214635 A1* | 8/2010 | Sasaki | ............... | G02B 27/0101 |
| | | | | 359/15 |
| 2016/0247255 A1* | 8/2016 | Staudenmaier | .... | G02B 27/0025 |

* cited by examiner

| Cell 210-1 | Cell 210-2 | Cell 210-3 | Cell 210-4 | Cell 210-5 | Cell 210-6 | Cell 210-7 |
|---|---|---|---|---|---|---|
| Cell 210-8 | Cell 210-9 | Cell 210-10 | Cell 210-11 | Cell 210-12 | Cell 210-13 | Cell 210-14 |
| Cell 210-15 | Cell 210-16 | Cell 210-17 | Cell 210-18 | Cell 210-19 | Cell 210-20 | Cell 210-21 |
| Cell 210-22 | Cell 210-23 | Cell 210-24 | Cell 210-25 | Cell 210-26 | Cell 210-27 | Cell 210-28 |
| Cell 210-29 | Cell 210-30 | Cell 210-31 | Cell 210-32 | Cell 210-33 | Cell 210-34 | Cell 210-35 |
| Cell 210-36 | Cell 210-37 | Cell 210-38 | Cell 210-39 | Cell 210-40 | Cell 210-41 | Cell 210-42 |
| Cell 210-43 | Cell 210-44 | Cell 210-45 | Cell 210-46 | Cell 210-47 | Cell 210-48 | Cell 210-49 |
| Cell 210-50 | Cell 210-51 | Cell 210-52 | Cell 210-53 | Cell 210-54 | Cell 210-55 | Cell 210-56 |

Image Warping Field 200

FIG. 2

Cell 210-1: Warping Coefficient 220-1-1, Warping Coefficient 220-1-2, Warping Coefficient 220-1-3, Warping Coefficient 220-1-4, Warping Coefficient 220-1-5

Cell 210-2: Warping Coefficient 220-2-1, Warping Coefficient 220-2-2, Warping Coefficient 220-2-3, Warping Coefficient 220-2-4, Warping Coefficient 220-2-5

Cell 210-3: Warping Coefficient 220-3-1, Warping Coefficient 220-3-2, Warping Coefficient 220-3-3, Warping Coefficient 220-3-4

FIG. 3

Per Pixel Warping Map
900

| Pixel Movement 910-1 | Pixel Movement 910-2 | Pixel Movement 910-3 | Pixel Movement 910-4 | Pixel Movement 910-5 | Pixel Movement 910-6 |
|---|---|---|---|---|---|
| Pixel Movement 910-7 | Pixel Movement 910-8 | Pixel Movement 910-9 | Pixel Movement 910-10 | Pixel Movement 910-11 | Pixel Movement 910-12 |
| Pixel Movement 910-13 | Pixel Movement 910-14 | Pixel Movement 910-15 | Pixel Movement 910-16 | Pixel Movement 910-17 | Pixel Movement 910-18 |
| Pixel Movement 910-19 | Pixel Movement 910-20 | Pixel Movement 910-21 | Pixel Movement 910-22 | Pixel Movement 910-23 | Pixel Movement 910-24 |

FIG. 9

Partitioned Per Pixel Warping Map
1000

| Pixel Movement 910-1 | Pixel Movement 910-7 | Pixel Movement 910-13 | Pixel Movement 910-19 |
| Pixel Movement 910-2 | Pixel Movement 910-8 | Pixel Movement 910-14 | Pixel Movement 910-20 |
| Pixel Movement 910-3 | Pixel Movement 910-9 | Pixel Movement 910-15 | Pixel Movement 910-21 |
| Pixel Movement 910-4 | Pixel Movement 910-10 | Pixel Movement 910-16 | Pixel Movement 910-22 |
| Pixel Movement 910-5 | Pixel Movement 910-11 | Pixel Movement 910-17 | Pixel Movement 910-23 |
| Pixel Movement 910-6 | Pixel Movement 910-12 | Pixel Movement 910-18 | Pixel Movement 910-24 |

Cell 1110-1, Cell 1110-2, Cell 1110-3, Cell 1110-4

TWO-DIMENSIONAL PIECEWISE APPROXIMATION TO COMPRESS IMAGE WARPING FIELDS

CROSS REFERENCE TO RELATED APPLICATIONS

This application is a continuation of U.S. patent application Ser. No. 14/977,469 which was filed with the U.S. Patent and Trademark Office on Dec. 21, 2015.

BACKGROUND OF THE INVENTION

Field of the Invention

Modern display technology may be implemented to provide a head worn display (HWD) or a heads up display (HUD). Such HWDs and/or HUDs can be implemented to provide a display of a virtual image (e.g., images, text, or the like). The virtual image may be provided in conjunction with a real world view. Such HWDs and/or HUDs can be implemented in a variety of contexts, for example, defense, transportation, industrial, entertainment, wearable devices, or the like.

Many HWD and/or HUD systems project an image onto a projection surface. In some cases, the image is reflected off the projection surface to a virtual projection surface, sometimes referred to as an exit pupil. With some projection systems, distortions in the projected image may manifest to a user. For example, certain characteristics of the projection surface can distort or warp a projected image, resulting in perceived distortions.

An image can be pre-warped, or pre-distorted, prior to projection to correct the distortion resulting from the projection surface. As such, during operation, a pre-warped image is projected and an undistorted image may be perceived by the user. However, pre-warping an image requires a significant amount of computing resources (e.g., memory resources, computation resources, or the like).

BRIEF DESCRIPTION OF THE DRAWINGS

FIG. 2 illustrates a first example image warping field.
FIG. 3 illustrates a portion of the first example image warping field of FIG. 2.
FIG. 9 illustrates an example per pixel warping map.
FIG. 10 illustrates an example partitioned per pixel warping map.

DETAILED DESCRIPTION

Figure 1:
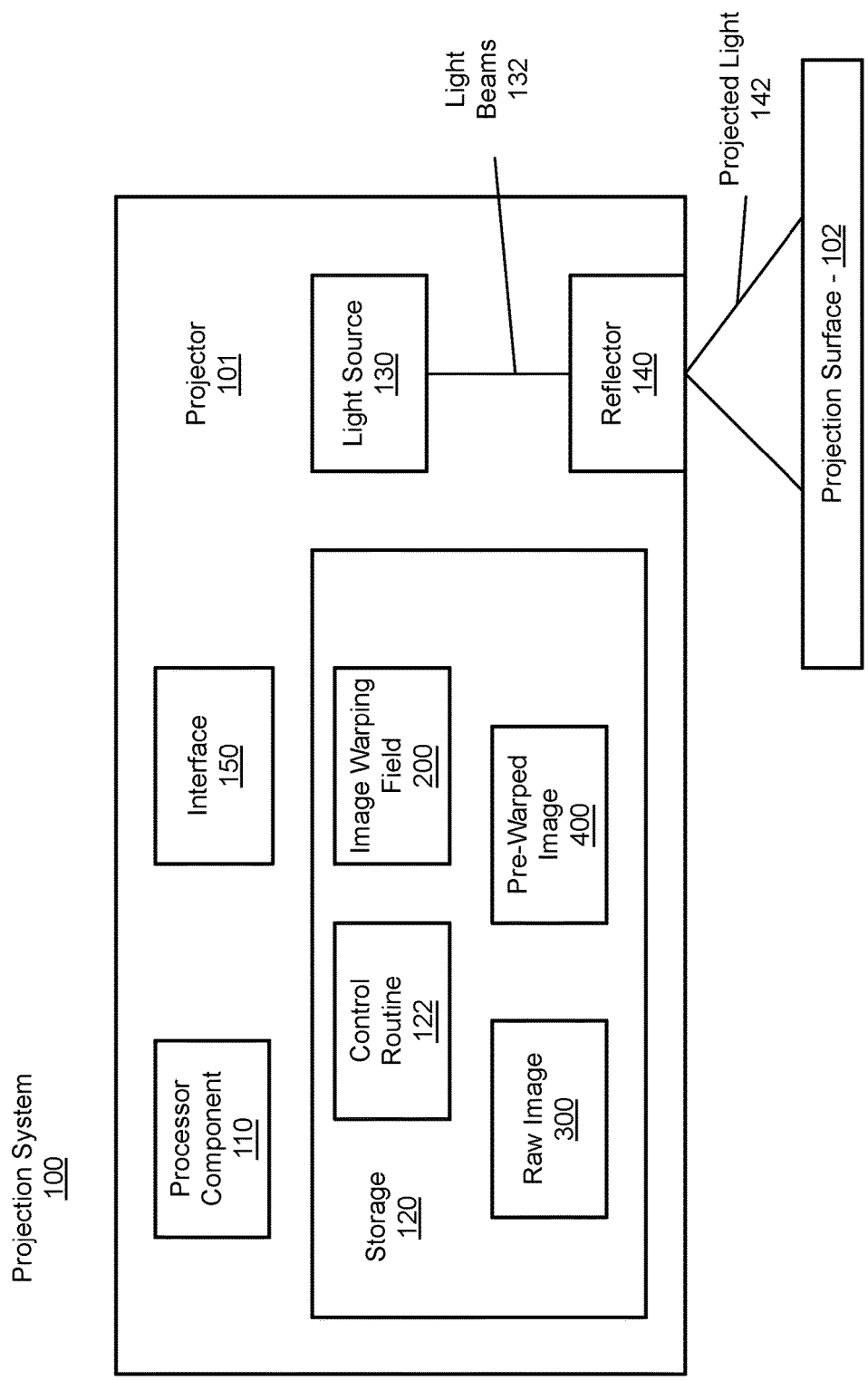
FIG. 1 illustrates an embodiment of a projection system.

Various embodiments are generally directed to pre-warping an image to be projected in a projection system, such as, for example, a HWD. In general, a computing device can pre-warp an image based on an image warping field. An image can be pre-warped using a look up table including an entry for each pixel of the image to be warped. In particular, the look up table can include an amount to warp or distort each pixel of an image to generate a pre-warped image. Accordingly, during operation, each image to be projected can be warped based on the look up table. However, such look up tables can be quite large, particularly for warping high resolution images. Additionally, memory and computation requirements needed to warp an image based on such look up tables can be significant.

In general, the present disclosure provides image warping fields implemented as a piecewise multivariate polynomial approximation of the per pixel warping map (e.g., look up table, or the like). A computing device can pre-warp, or pre-distort, an image prior to projection in a projection system based on these piecewise multivariate polynomial approximations. In particular, the image warping fields of the present disclosure can be implemented to pre-warp an image to correct distortions of the image manifest during projection, for example, due to characteristics of the projection surface. With some examples, the piecewise multivariate polynomial approximation can be implemented by a projection system controller to pre-warp an image prior to projection in the projection system.

In general, the present disclosure provides image warping field that are divided into a grid having a number of cells, with a polynomial approximation for the image warping field assigned to each cell in the grid. With some examples, multiple piecewise multivariate polynomial approximations can be generated for a projection system. For example, in some projection systems, multiple light sources are implemented. Accordingly, in some examples, an approximation to the per pixel image warping data can be provided for each light source. Said differently, multiple image warping fields can be provided for the same projection system (e.g., one for each light source, or the like).

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a projection system 100, arranged according some examples of the present disclosure. In general, the projection system 100 comprises the projector 101 and the projection surface 102. In general, the projection system 100 can be implemented as either a unified system or as separate components. For example, the projection system 100 can be implemented as a HWD, a HUD, a body worn projector (e.g., a watch, or the like), a portable projector, a desktop projector, or the like. With some examples, the projection system 100 can be provided with the projection surface 102 as depicted. In some examples, the projection system 100 can be implemented without the projection surface 102 while a projection surface is provided by a system integrator, a user, or the like. It is worthy to note, that the present disclosure is particularly directed to image warping fields, and as such, can be implemented to provide an image warping field to pre-warp an image to be projected by any of a variety of different projection systems, such as, for example, the projection system 100, or a projection system having similar or different components than the projection system 100. Examples are not limited in this context.

The projector 101 can incorporate one or more of a processor component 110, storage 120, a light source 130, a reflector 140, and an interface 150 to couple the computing device 100 to a network (not shown). The storage 120 stores one or more of a control routine 122, an image warping field 200, a raw image 300, and a pre-warped image 400.

In general, the control routine 122 can be implemented and/or executed by the processor component 110. For example, the control routine 122 can incorporate a sequence of instructions operative on the processor component 110 in its role as a main processor component to implement logic to perform various functions. With some examples, the control routine 122 can be implemented as logic, at least a portion of which is implemented in hardware, to perform various functions. For example, the control routine 122 can be implemented by a field programmable gate array (FPGA), by an application specific integrated circuit (ASIC), or by a combination of logic, such as, for example, registers, gates, transistors, or the like.

With some examples, the projector 101 can receive the raw image 300 from a computing device operably coupled to the projector, for example, via a wired or wireless connection. In some examples, the projector 101 can generate the raw image 300. Examples are not limited in this context.

Examples of the projector 101 generating the pre-warped image 400 from the raw image 300 and the image warping field 200 are described in greater detail below, for example, with respect to FIGS. 3-6. However, in general, the image warping field 200 comprises a number of cells (e.g., refer to FIGS. 2-3) with each cell comprising a polynomial warping function. Said differently, each cell of the image warping field 200 can comprise a number of warping coefficients, which can be used to warp pixels of the raw image. More specifically, each cell of the image warping field 200 can correspond to a number of pixels in the raw image 300 (e.g., refer to FIGS. 4-5). Each of these pixels can be warped based on the warping coefficients (e.g., or a polynomial function including the warping coefficients) from the cell to which the pixels correspond. This is explained in greater detail below.

The light source 130 can emit light beams 132 corresponding to the pixels of the pre-warped image. The reflector 140 can receive the light beams 132 and reflect the light beams 132 to scan the light beams 132 across the projection surface 102 as projected light beams 142 to project an image on the projection surface 102. It is noted, that as the light beams 132 correspond to the pre-warped image, then the projected image may be perceived without distortion. Said differently, the image warping field 200 can be configured with warping coefficients to pre-warp an image for projection on the projection surface 102. This is explained in greater detail below (e.g., refer to FIG. 13).

In various examples, the processor component 110 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked. In some examples, the processor component 110 can comprise an FPGA, an ASIC, or the like.

In various examples, the storage 120 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various examples, the processor component 110 and the storage 120 can be implemented as a unitary assembly. For example, the processor component 110 can be implemented as various logical elements (e.g., gates, transistors, flip-flops, or the like) while the storage 120 is implemented as registers. In such an example, the raw image 300 could be received as a bit stream (e.g., corresponding to the pixels, or the raw image 300, or the like) while the pre-warped image 400 is output as a bit stream.

In various examples, the light source 130 can include any of a variety of light sources, such as, for example, a laser, a light emitting diode (LED), or the like.

In various examples, the reflector 140 can include any of a variety of reflector or projection systems. In some examples, the reflector 140 can comprise a microelectromechanical system (MEMS) mirror system to reflect and scan the light 132 as projected light 142.

In various examples, the interface 150 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1.times.RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

FIGS. 2-3 are block diagrams of an example image warping field 200, arranged according to some examples of the present disclosure. In particular FIG. 2 depicts the example image warping field 200 while FIG. 3 depicts a portion of the example image warping field 200. FIGS. 2-3 are described together herein for purposes of clarity.

In general, the image warping field is an M.times.N array of cells 210-$a$, where "a" is a positive integer. It is worthy to note, that the image warping field 200 is depicted as a 7.times.8 array of 56 cells. In particular, the image warping field 200 is depicted with cells 210-1 to 210-56. However, the image warping field 200 can be implemented with any number of cells. For example, an image warping field could be implemented as a 4.times.4 array of 16 cells, as an 8.times.8 array of 64 cells, or the like. Examples are not limited in this context.

Each of the cells 210-$a$ includes a number of warping coefficients 220-$a$-$b$, where "b" is a positive integer. For example, FIG. 3 depicts the cells 210-1, 210-2, and 210-3. The cell 210-1 includes the warping coefficients 220-1-1 to 220-1-5; the cell 210-2 includes the warping coefficients 220-2-1 to 220-2-5; and the cell 210-3 includes the warping coefficients 220-3-1 to 220-3-4. It is worthy to note, that the image warping field 200 can be implemented with cells 210-$a$ having any number of warping coefficients. Furthermore, each of the cells 210-$a$ need not have the same number of warping coefficients. Examples are not limited in this context.

In general, the warping coefficients of each cell (e.g., the warping coefficients 220-1-1 to 220-1-5, 220-2-1 to 220-2-5, 220-3-1 to 220-3-4, or the like) correspond to coefficients of a polynomial function. For example, a cell 210-$a$ having D warping coefficients can be implemented as the following polynomial function:

$$f(x)=WC_D x^D+WC_{D-1} x^{D-1}+\ldots+WC_3 x^3+WC_2 x+WC$$

Where WC is the warping coefficient. As a specific example, the warping coefficients 220-1-$b$ of the first cell 210-1 can be implemented as the following polynomial function:

$$f(x)=[220\text{-}1\text{-}5]x^4+[220\text{-}1\text{-}4]x^3+[220\text{-}1\text{-}3]x^2+[220\text{-}1\text{-}2]x+[220\text{-}1\text{-}1]$$

Accordingly, the warping coefficients 220-$a$-$b$ can be used as a polynomial function to warp pixels of the raw image 300 to generate the pre-warped image 400. This is described in greater detail below, for example, with reference to an example raw image and an example pre-warped image. It is worthy to note, that the warping coefficients can be implemented in a variety of different functions and need not be necessarily be traditional polynomial functions. For example, the warping coefficients could be implemented as functions involving square roots, or other mathematical operations not found in traditional polynomials. Examples are not limited in this context.

In general, the image warping field can be implemented to warp pixels (e.g., refer to FIGS. 4-5) of a raw image to generate a pre-warped image. For example, the processing unit 110 can generate a pre-warped pixel based on a pixel and a cell 210-$a$ of the image warping field 200. More specifically, the processing unit 110 can determine a cell 210-$a$ of the image warping field 200 corresponding to a number of pixels of the raw image 300. The processing unit 110 can retrieve the warping coefficients 210-$a$-$b$ of the cell 210-$a$ corresponding to the pixels. The processing unit 110 can determine warped pixels based on the pixels and retrieved warping coefficients 210-$a$-$b$. In particular, the processing unit 110 can determine warped pixels based on deriving a warped pixel from a polynomial function assembled from the retrieved warping coefficients 210-$a$-$b$. with some examples, a position of the pixels is modified and/or adjusted based on the polynomial function. With some examples, a characteristic of the pixels (e.g., color, hue, balance, brightness, or the like) is modified and/or adjusted based on the polynomial function.

Figure 4:
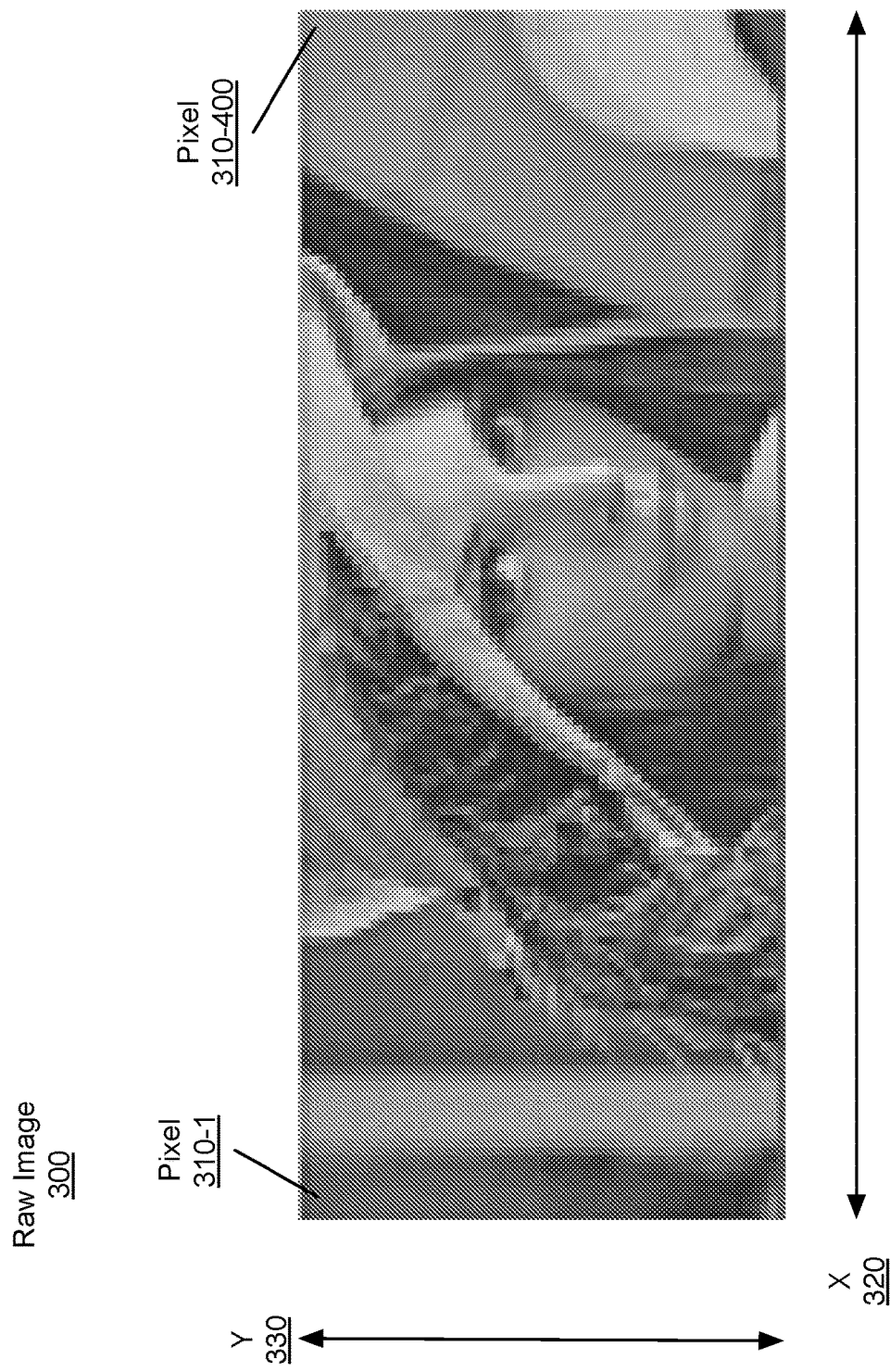
FIG. 4 illustrates an example of a raw image.
Figure 5:
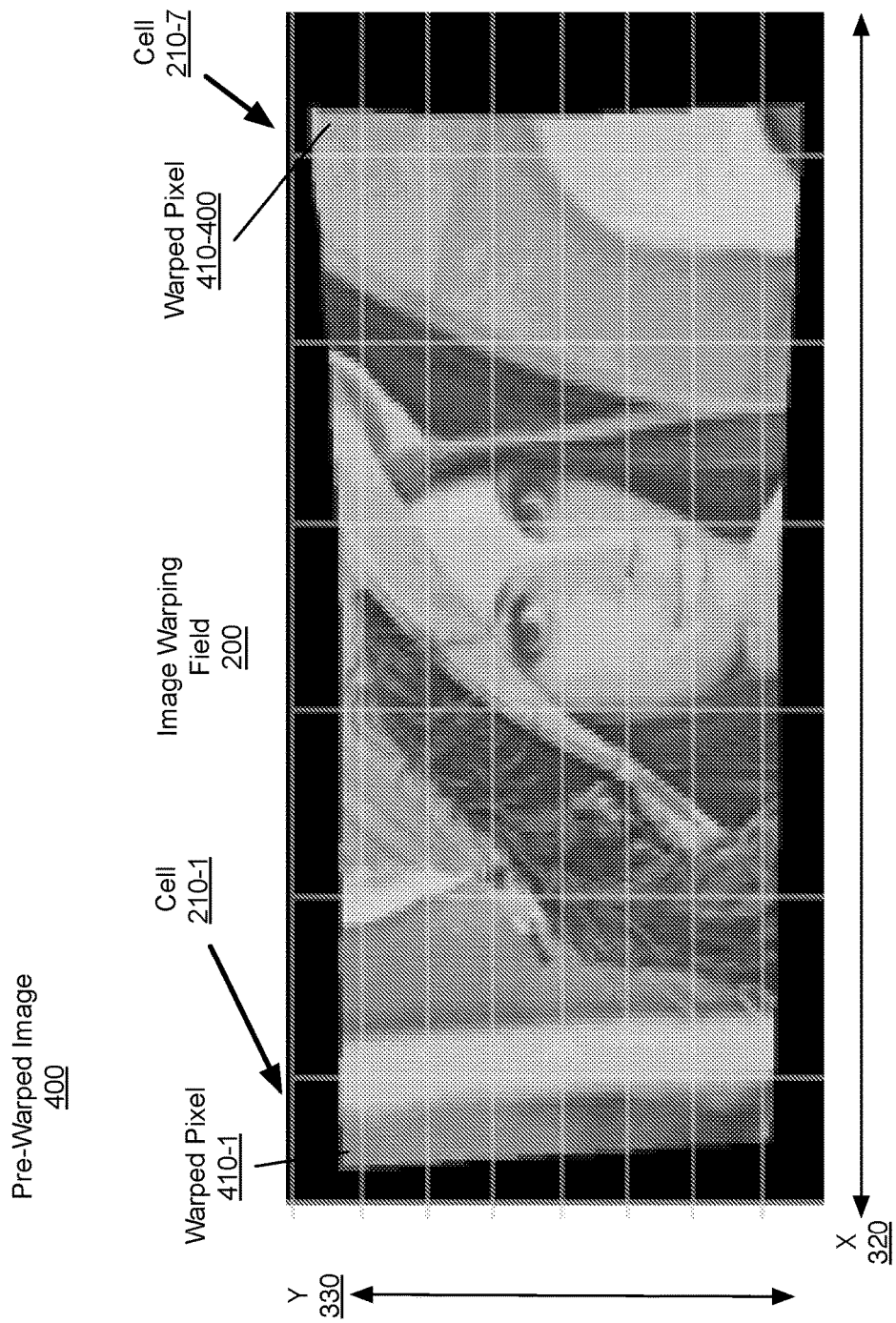
FIG. 5 illustrates an example of a pre-warped image.

FIGS. 4-5 depict an example raw image 300 and an example pre-warped image 400. In particular, FIG. 4 depicts the example raw image 300 while FIG. 5 depicts the example pre-warped image 400. It is noted, that the image is given strictly as an example and that during practice, the projector 101 can generate a pre-warped image from any of a variety of raw images and the raw image 300 and pre-warped image 400 may not necessarily be the images depicted in these figures.

Turning more particularly to FIG. 4, the raw image 300 is depicted. The raw image 300 is comprised of a number of pixels 310-c, where "c" is a positive integer. For example, pixel 310-1 and pixel 310-400 are depicted for purposes of illustration only. It is noted, that the raw image 300 may have any number of pixels and all pixels are not denoted in the figures for purposes of clarity. Examples are not limited in this context.

In general, the raw image 300 has a particular resolution. For example, the raw image 300 has a resolution defined in X, Y pixels. Specifically, the raw image 300 has a resolution defined by the width 320 of the image 300 in pixels and the height 330 of the image 300 in pixels. The width 320 and the height 330 are depicted as the x and y axis in FIG. 4, respectively.

As noted above, in some projection systems (e.g., the projection system 100) projecting the raw image 300 may result in perceivable distortions to a user. Accordingly, the pre-warped image 400 can be generated (e.g., from the raw image 300, or the like) and projected to reduce perceived distortions in the projected image.

Turning more particularly to FIG. 5, the pre-warped image 400 is depicted. Additionally, the pre-warped image 400 is depicted overlaid with the image warping field 200. As can be seen, the pre-warped image 400 is distorted as compared to the raw image 300. In particular, the pre-warped image 400 includes warped pixels 410-c, which correspond to pixels 310-c of the raw image 300. More specifically, the position of some of the pixels 310-c has been modified in the warped image 400. For example, the position of the pixel 410-400 in the pre-warped image 400 is adjusted relative to the position of the same pixel 310-400 in the raw image 300.

As noted, the processing unit 110 generates the pre-warped pixels 410-c from the pixels 310-c based on the warping coefficients 210-a-b of the cells 210-a. In particular, the warping coefficients 210-a-b of the cells 210-a corresponding to (e.g. overlaying, or the like) the pixels 310-c are used to determine the warped pixels 410-c. For example, the pixel 310-1 is overlaid by the cell 210-1. As such, the processing unit 110 can generate the warped pixel 410-1 from the pixel 310-1 and the warping coefficients 220-1-b. More specifically, the processing unit 110 can generated the warped pixel 410-1 from the pixel 310-1 and a polynomial function assembled from the warping coefficients 220-1-b. As another example, the pixel 310-400 is overlaid by the cell 210-7. As such, the processing unit 110 can generate the warped pixel 410-400 from the pixel 310-400 and the warping coefficients 220-7-b. More specifically, the processing unit 110 can generated the warped pixel 410-400 from the pixel 310-400 and a polynomial function assembled from the warping coefficients 220-7-b.

Figure 6:
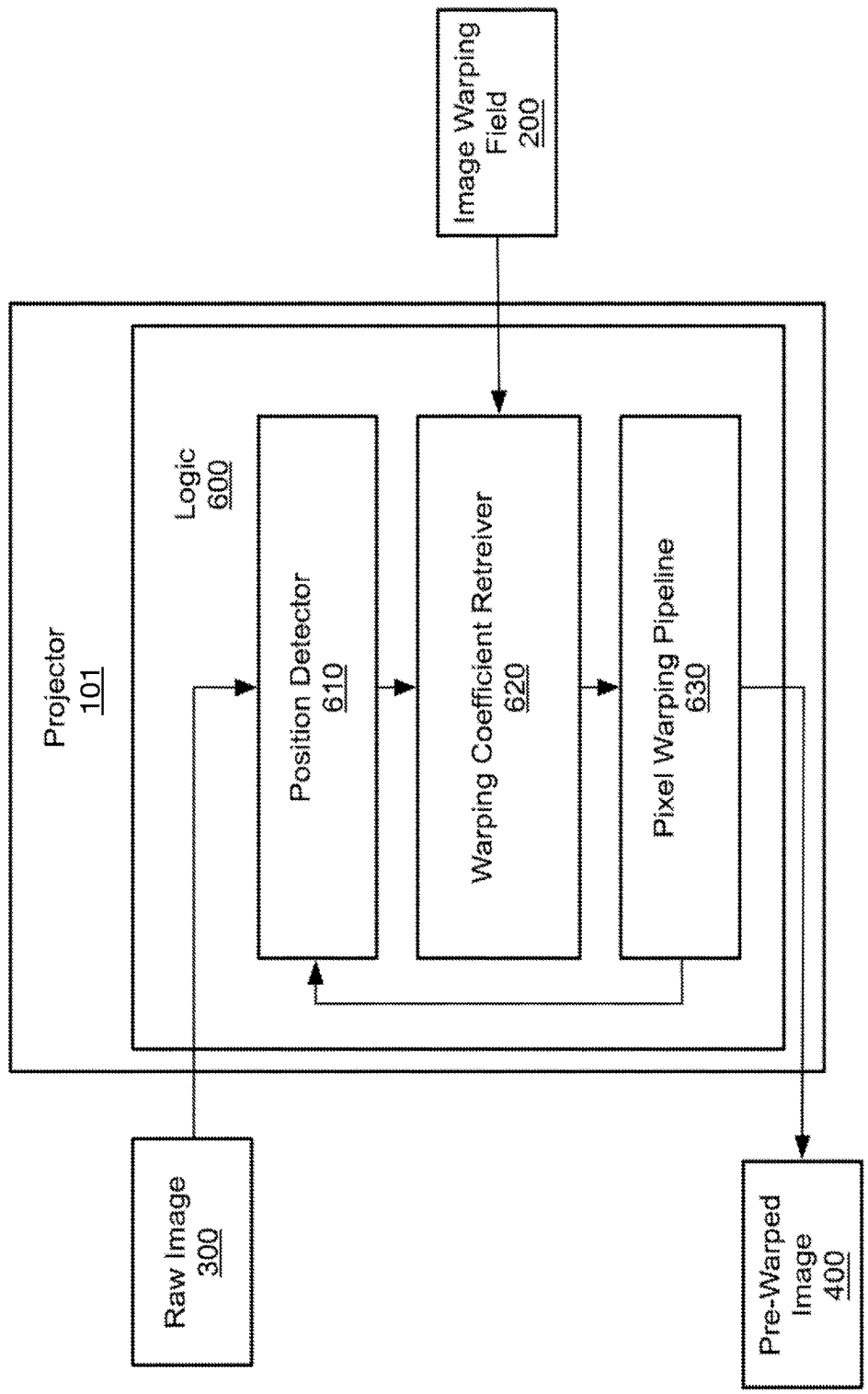
FIG. 6 illustrates an example of a portion of the projection system of FIG. 1.

FIG. 6 is a block diagram of portions of the projector 101. The projector 101 includes logic 600. In general, the logic 600 can be instructions to be executed by a processing unit (e.g., the control routine 122 to be executed by the processor component 110) or can be hardware logic (e.g., an FPGA, an ASIC, or the like). The logic 600 includes a position detector 610, a warping coefficient retriever 620, and a pixel warping pipeline 630.

During operation, the logic 600 can receive the raw image 300 to be warped based on the image warping field 200. Said differently, the logic 600 can generate the pre-warped image 400 from the raw image 300 and the image warping field 200.

The position detector 610 can determine ones of the pixel 310-c of the raw image 300 corresponding to a cell 210-a of the image warping field 200. It is worthy to note, that often a number of the pixel 310-c can correspond to a single cell 210-a. As such, in some example, the warping coefficient retriever 620 can retrieve the warping coefficients 220-a-b from the specific cell 210-a. For example, the position detector 610 can determine ones of the pixels 310-c of the raw image 300 corresponding to the cell 210-1 while the warping coefficient retriever 620 retrieves the warping coefficients 220-1-b.

The pixel warping pipeline 630 can generate warped pixels 410-c from the number of pixels 310-c corresponding to the specific cell 210-a and the retrieved warping coefficients 220-a-b. In some examples, the pixel warping pipeline 630 can be implemented as a number of logical elements, arranged to warp a pixel (e.g., the pixel 310-c, or the like) given that warping coefficients 220-a-b for the cell 210-a corresponding to the pixel have been retrieved. In particular, with some examples, the pixel warping pipeline 630 can include four signed 16-bit by 9-bit multipliers, four 25-bit signed right shifters, four signed 16-bit output adders and 14 flip-flops. In some examples, the pixel warping pipeline 630 can be implemented using multiple such components to determine multiple (e.g., three, or the like) warped pixels 410-c per clock cycle from a single pixel. Accordingly, three image warping fields 200 (e.g., different image warping fields 200 for each light source 130, or the like) could be used and corresponding warped pixels 410-c could be determined from the pixels 310-c of the raw image 300.

In some examples, the pixel warping pipeline could be modeled based on the following architecture, where "X" and "Y" are the coordinates of the pixel 310-c to be warped and WARPED_X is the x coordinate of the warped pixel 410-c. It is noted, in the assignment statements that follow, all blocks share the same clock signal, all variable names represent flip-flops, and mathematical operators represent corresponding separate arithmetic blocks.

R0[25:0]<=[15:0]*X[8:0]
R1[14:0]<=R0[24:0]>>>10
R2[15:0]<=R1[14:0]+A1[15:0]
RX[8:0]<=X[8:0] [0058] RY[8:0]<=Y[8:0]
R3[24:0]<=R2[15:0]*RX [8:0]
R4[15:0]<=R3[24:0]>>>9
R5[15:0]<=R4[15:0]+A2[15:0]
R6[24:0]<=B0[15:0]*Y[8:0]
R7[14:0]<=R6[24:0]>>>10
R8[15:0]<=R7[14:0]+B1[15:0]
R9[24:0]<=R8[15:0]*RY[8:0]
R10[15:0]<=R9[24:0]>>>9
WARPED_X[15:0]<=R10[15:0]+R5[15:0]

Figure 7:
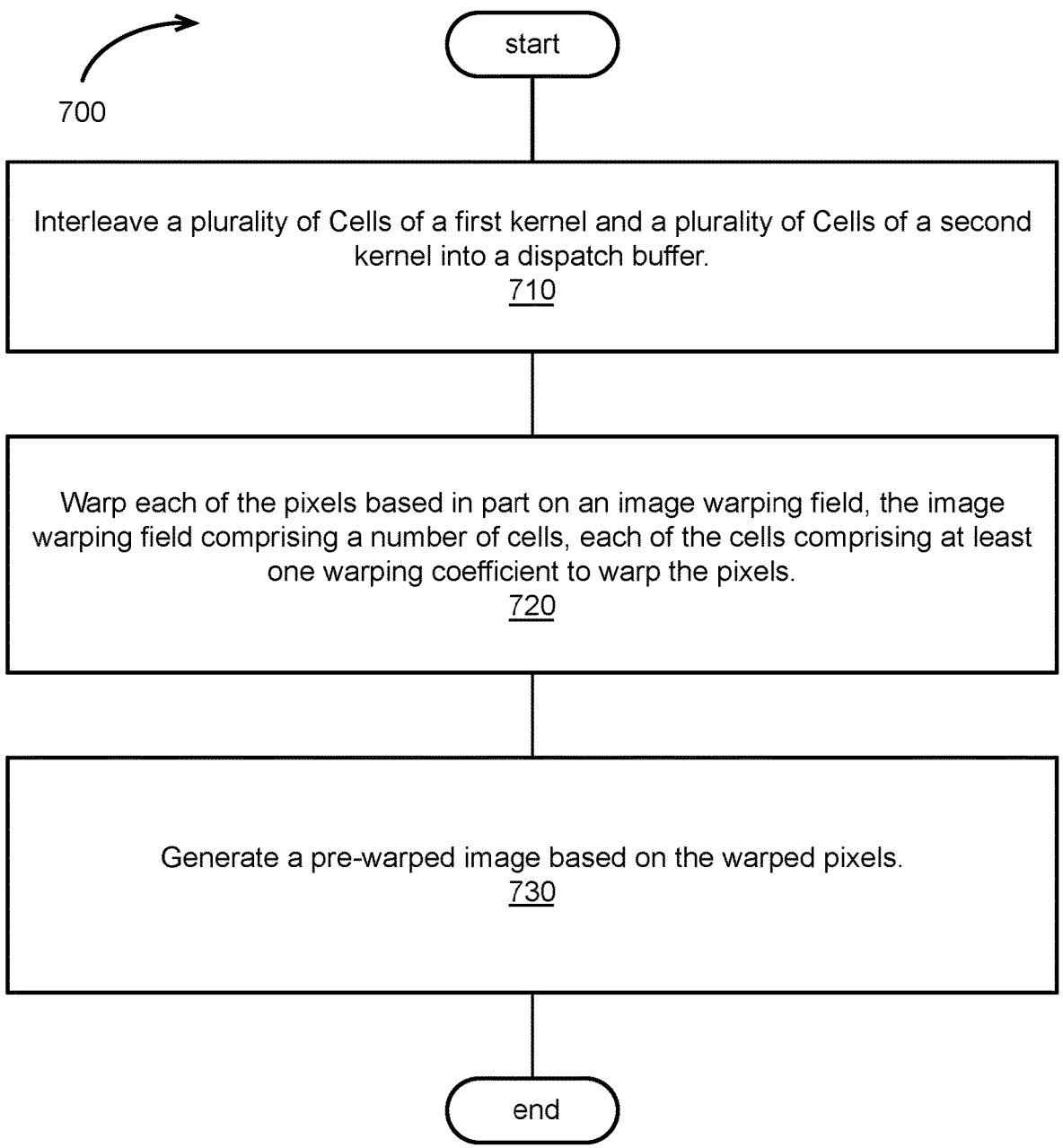
FIG. 7 illustrate a first example logic flow.

FIG. 7 illustrates one an example logic flow 700. The logic flow 700 may be representative of some or all of the operations implemented by one or more examples described herein. More specifically, the logic flow 700 may illustrate operations performed by the processor component 110 of the projector 101.

The logic flow 700 may begin at block 710. At block 710 "receive an image to be warped, the image comprising a number of pixels," the projector 101 can receive an image to be warped. For example, the projector 101 can receive the raw image 300. In some examples, the projector 101 receives the raw image 300 via the interface 150. In some examples, the projector 101 receives the raw image 300 from storage 120. In some examples, the projector 101 generates the raw image 300 (e.g., via a graphics processing unit (GPU), or the like). In general, the received image comprises a number of pixels. For example, FIG. 4 depicts the raw image 300 comprising pixels 310-c (e.g., the pixel 310-1, the pixel 310-400, etc.).

Continuing to block 720 "warp each of the pixels based in part on an image warping field, the image warping field comprising a number of cells, each of the cells comprising at least one warping coefficient to warp the pixels," the projector 101 can warp the pixels of the received image based on an image warping field. For example, the processor component 110, in executing the control routine 122, can warp each of the pixels 310-c of the raw image 300 based on the image warping field 200.

In particular, with some examples, processor component 110, in implementing logic 600 can warp the pixels 310-c to generate warped pixels 410-c. In some examples, the position determiner 610 can determine, for a specific pixel 310-c, a cell 210-a of the image warping field 200 corresponding to the pixel 310-c. The warping coefficient retriever 620 can retrieve the warping coefficients 220-a-b from the determined cell 210-a. The pixel warping pipeline 630 can warp the specific pixel 310-c based on the retrieved coefficients to determine a corresponding warped pixel 410-c.

In some examples, the position determiner can determine a cell 210-a for a first pixel 310-c (e.g., the pixel 310-1, the pixel 310-400, or the like) of the raw image 300. Subsequently, the pixel warping pipeline can warp pixels 310-c within the same cell 210-a. Said differently, the pixel warping pipeline can continue to warp pixels until a boundary crossing, or until all pixels within the cell 210-a have been warped. At which point, the logic 600 can determine a new cell 210-a, retrieve warping coefficients 220-a-b for the newly determined cell, and determine warped pixels 410-c for the pixels corresponding to the newly determine cell 210-a.

Continuing to block 730 "generate a pre-warped image based on the warped pixels," the projector 101 can generate the pre-warped image 400 from the warped pixels 410-c.

FIGS. 8-13 depict examples to determine an image warping field (e.g., the image warping field 200, or the like) from a per pixel warping map. As noted above, conventionally, a pre-warped image (e.g., the pre-warped image 400, or the like) was generated based on a look up table or other database where each pixel in a raw image (e.g., the raw image 300, or the like) was referenced with a corresponding movement or adjustment to warp the pixel. For large images, such as, high definition or high resolution images, such a per pixel warping map can be substantially large and can require a substantial amount of computing resources to generate a pre-warped image. The present disclosure provides an image warping field with a low error rate and substantially reduced computational requirements versus the per pixel warping map. For example, in some examples, an image warping field for a high definition image can be generated to have less than 2% error rate and a 60,000% reduction in size versus a per pixel warping map.

Figure 8:
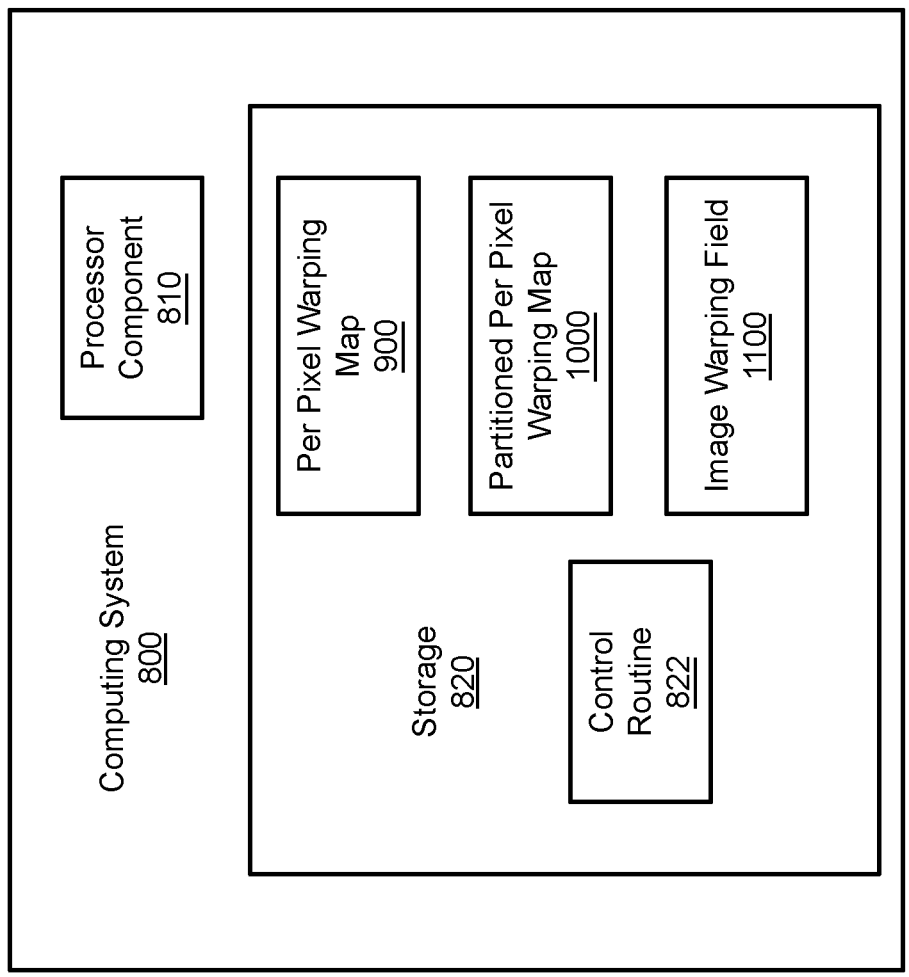
FIG. 8 illustrates an example computing system.

FIG. 8 illustrates a block diagram of an example computing system 800. In general, the computing system 800 can be any of a variety of computing systems, such as, for example, a workstation, a server, a laptop computer, a cloud based computing device, or the like. The computing system 800 can include a processor component 810 and storage 820. The computing device 800 could also include any of a variety of other computing components (e.g., refer to FIG. 16) to form a computing system needed to implement the present disclosure.

The storage 820 stores one or more of a control routine 822, a per pixel warping map 900, a partitioned per pixel warping map 1000, and an image warping field 1100.

In general, the control routine 822 can be implemented and/or executed by the processor component 810. For example, the control routine 822 can incorporate a sequence of instructions operative on the processor component 810 in its role as a main processor component to implement logic to perform various functions.

Figure 11:
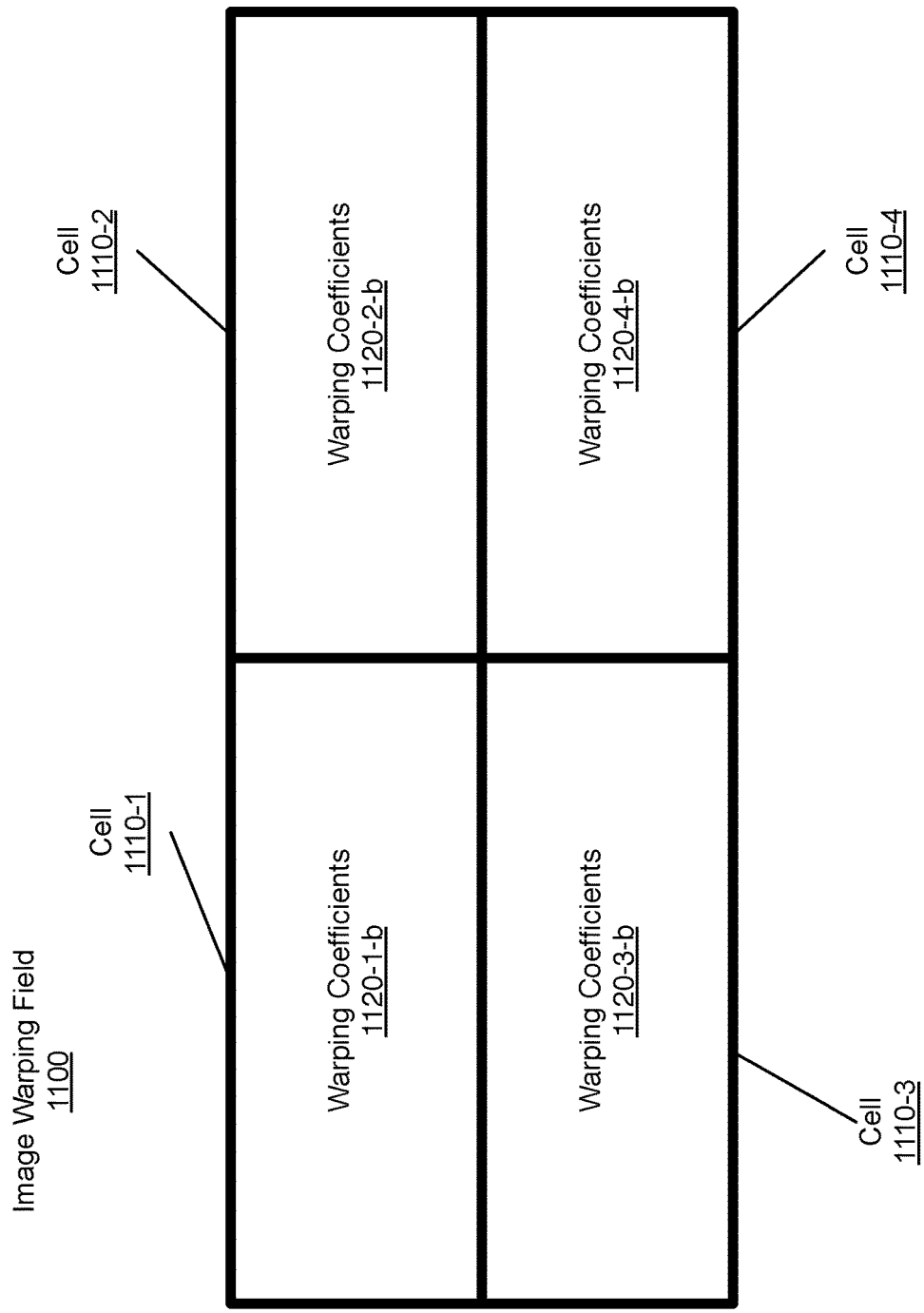
FIG. 11 illustrates a second example image warping field.
Figure 12:
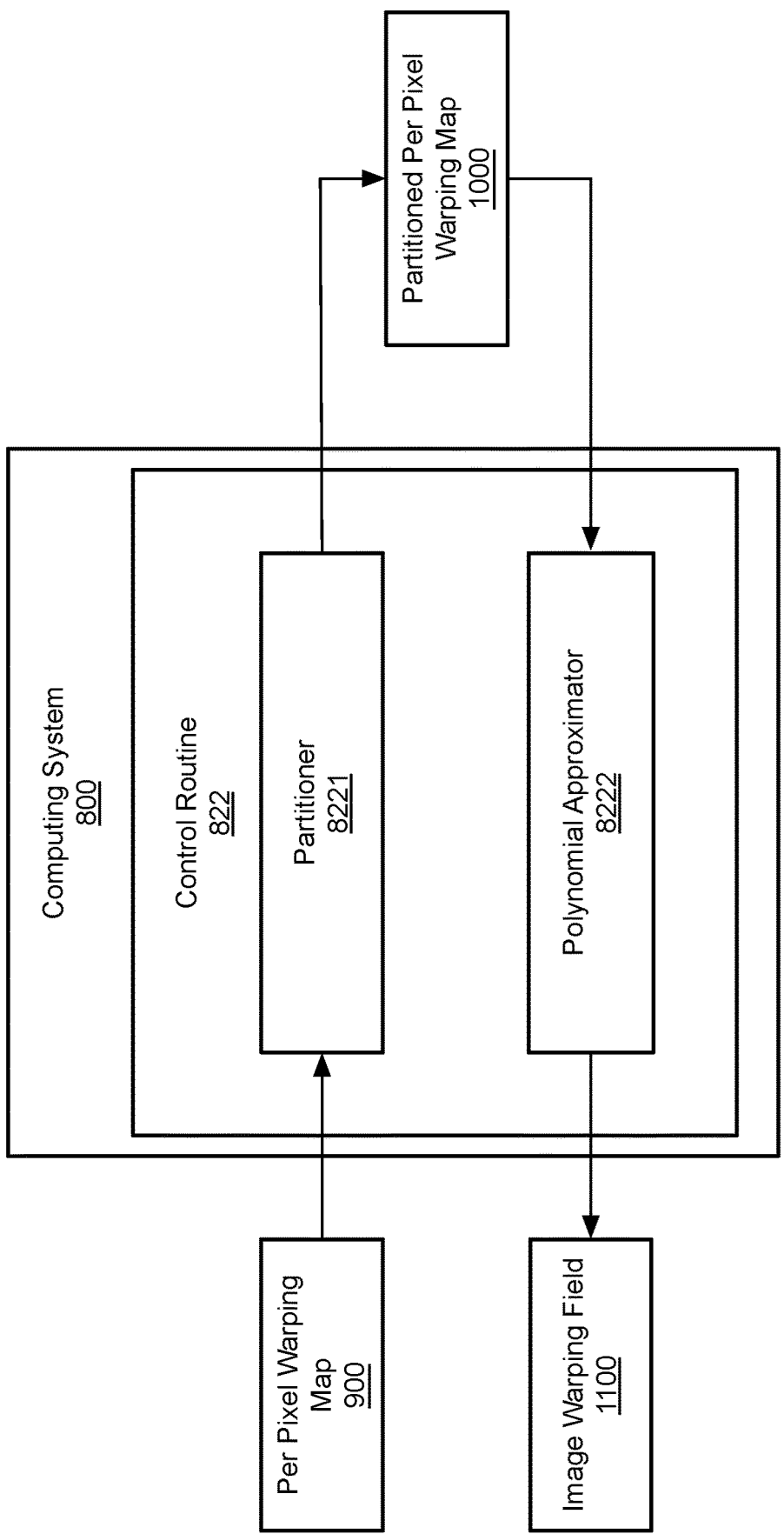
FIG. 12 illustrates a portion of the example computing system of FIG. 8.
Figure 13:
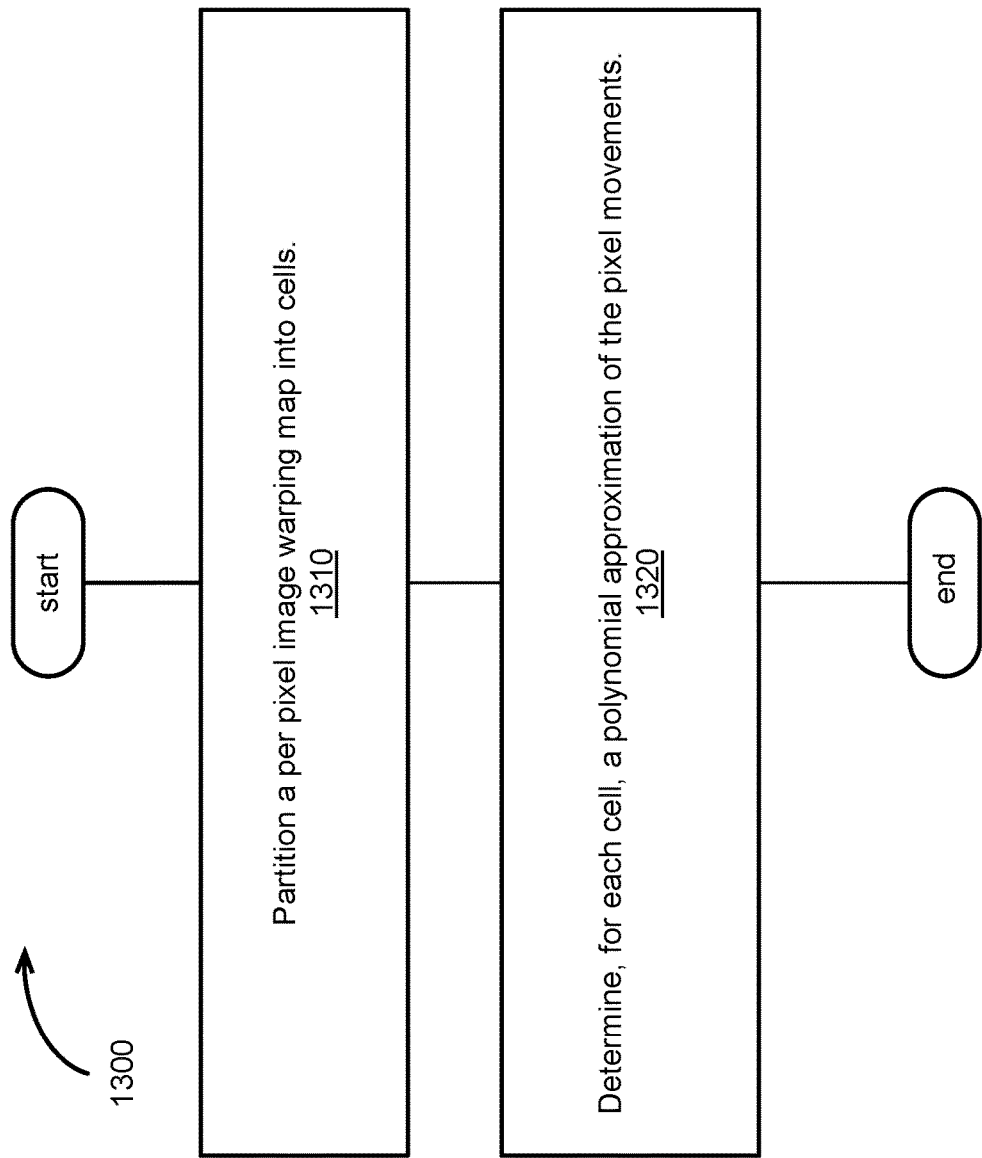
FIG. 13 illustrate a second example logic flow.

Operation of the computing system 800, and particularly, the processor component 810 in executing the control routine 822, is described in greater detail below. For example, with reference to FIGS. 9-13. In general, FIGS. 9-11 illustrate an example per pixel image warping map 900, an example partitioned image warping map 1000, and an example image warping field 1100, respectively. FIG. 12 illustrates an example of a portion of the computing system 800 of FIG. 8 and FIG. 13 illustrates an example logic flow 1300. The logic flow 1300 may be representative of some or all of the operations implemented by one or more examples described herein. More specifically, the logic flow 1300 may illustrate operations performed by the computing system 800 to determine the image warping field 1100 from the per pixel image warping map 900. Although the logic flow 800 is described with reference to the computing system 800 and the examples of FIGS. 9-12, embodiment are not limited in these contexts. Furthermore, as will be seen, the examples of FIGS. 9-11 are overly simplified for purposes of clarity of presentation.

More specifically, turning to FIG. 9, the per pixel warping map 900 is for a 6.times.4 resolution image, which is extremely small and impractical for most modern computing applications. In practice, the present disclosure can be implemented to generate an image warping field from a per pixel warping map for an image of any size resolution, even high definition images, images greater than 4,000 pixels, or the like. Due to the simplified nature of the per pixel warping map 900, the partitioned per pixel warping map 1000 and the image warping field 1100 are also simplified. However, examples are not limited in these contexts.

As depicted, the per pixel warping map 900 comprises a pixel movement 910-c, where "c" is a positive integer corresponding to the number of pixels in the image to be warped (e.g., the pixels of the raw image 300, or the like). Each of the pixel movements 910-c comprises an amount to displace or move the corresponding pixel in the raw image to generate a pre-warped image (e.g., the pre-warped image 400, or the like). As noted, the per pixel warping map 900 includes pixel movements 910-1 to 910-24, corresponding to a 6.times.4 resolution image.

Turning briefly to FIG. 13, the logic flow 1300 can begin at block 1310. At block 1310 "partition a per pixel warping map into cells," the processor unit 810 can partition a per pixel warping map into cells. For example, the processor unit 810 can partition the per pixel warping map 900 into cells. Turning to FIG. 10, the partitioned per pixel warping map 1000 is illustrated. As depicted, the partitioned per pixel warping map 1000 comprises cells 1110-a, where "a" is a positive integer. Each of the cells 1110-a include a number of the pixel movements 910-c. Said differently, each of the cells 1110-a corresponds to a number of the pixels of an image to be warped (e.g., the raw image 300, or the like). The partitioned per pixel warping map 1000 is depicted including cells 1110-1 to 1110-4. However, the per pixel warping map 900 could be partitioned into any of a number of different cells.

For example, turning more particularly to FIG. 12, the control routine 822 is illustrated in greater detail. The control routine 822 can include a partitioner 8221 and an approximator 8222. The partitioner 8221 can partition the per pixel warping map 900 to generate the partitioned per pixel warping map 1000. In particular, the partitioner can split the per pixel warping map 900 into cells 1110-c. In some examples, the partitioner 8221 can perform a depth first search to determine a number of cells 1110-c to split the per pixel warping map 900 into. This is described in greater detail below. However, in general, the partitioner 8221 can search between a range of cells (e.g., M.times.N, or the like) to identify the range with the lowest error, or the range falling within an acceptable error.

Turning again to FIG. 13, the logic flow 1300 can continue to block 1320 "determine, for each cell, a polynomial approximation for the pixel movements," the processing unit 810, in executing the control routine 822 can determine, for each cell 1110-a, a polynomial approximation (e.g., using warping coefficients 1120-a-b) of the pixel movements 910-c in each respective cell 1110-a. With some examples, the approximator 8222 can determine a polynomial approximation using a linear regression with independent variables.

For example, the approximator 8222 can determine warping coefficients 1120-1-b to 1120-4-b for each of the cells 1110-1 to 1110-4, respectively, based on a linear regression.

In some examples, the logic flow 1300 can be implemented recursively to determine a number of cells (e.g., the cells 1110-c, or the like) to partition the per pixel warping map into and to determine the warping coefficients (e.g., the warping coefficients 1120-a-b, or the like) having a sufficiently low error rate or falling within an acceptable error rate. In some examples, the logic flow 1300 can be implemented iteratively while changing the range of the cells (e.g., between 1 to 50, or the like) and while changing the number of variables in the polynomial approximation to determine the image warping map 1100 having a sufficiently low error rate.

Figure 14:
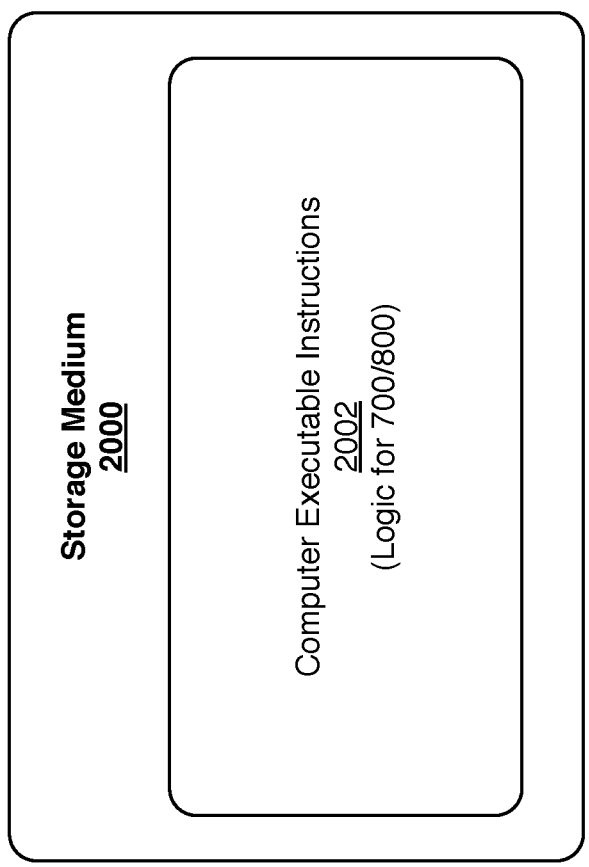
FIG. 14 illustrates an example storage medium.

FIG. 14 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). In some examples, the storage medium 2000 may store various types of computer executable instructions to implement the technique corresponding to logic flow 700. In some examples, the storage medium 2000 may store various types of computer executable instructions to implement the technique corresponding to logic flow 1300.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
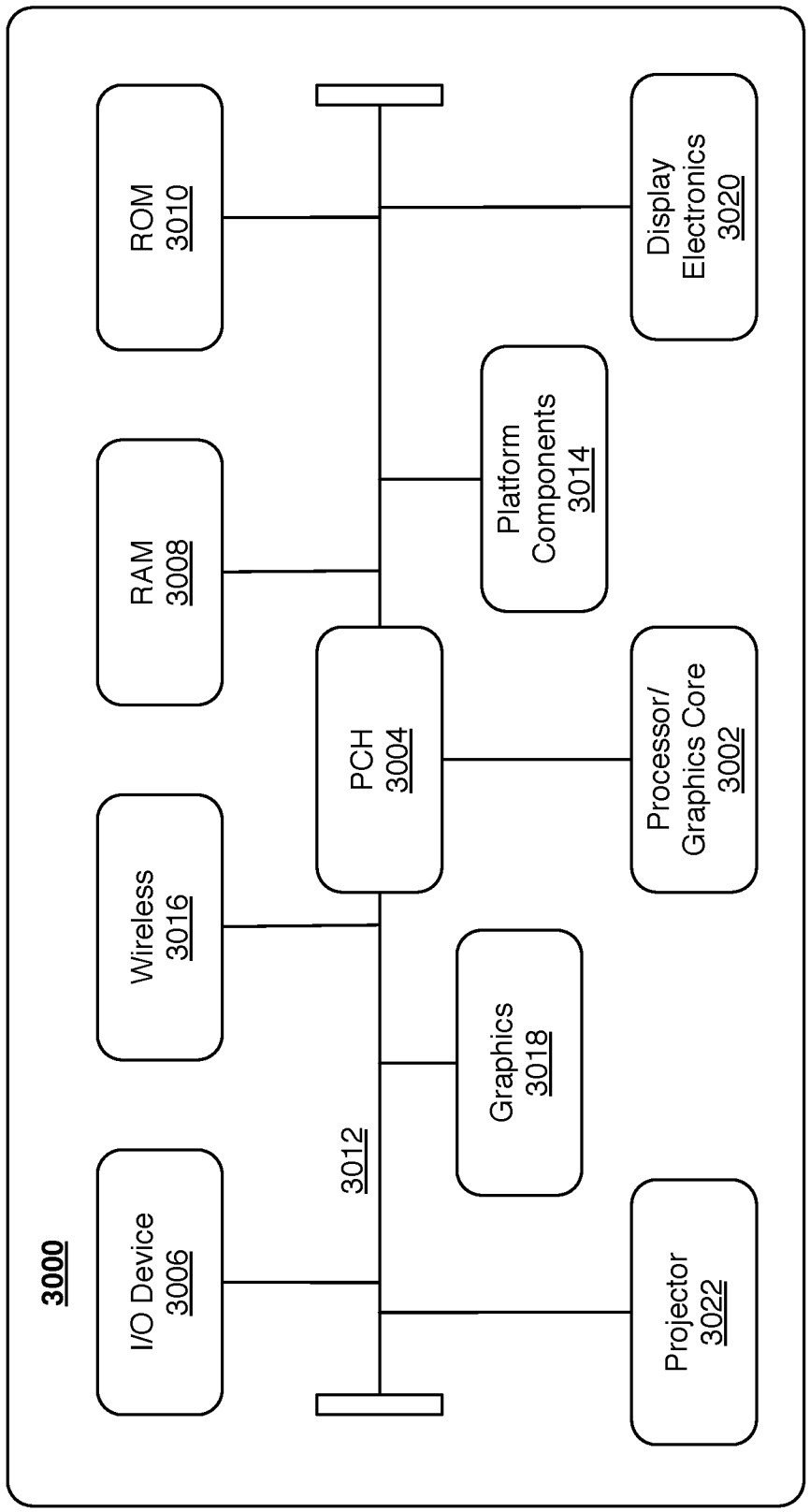
FIG. 15 illustrates a first example system.

FIG. 15 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020, projector 3022 (e.g., including the light source 130 and the reflector 140, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Figure 16:
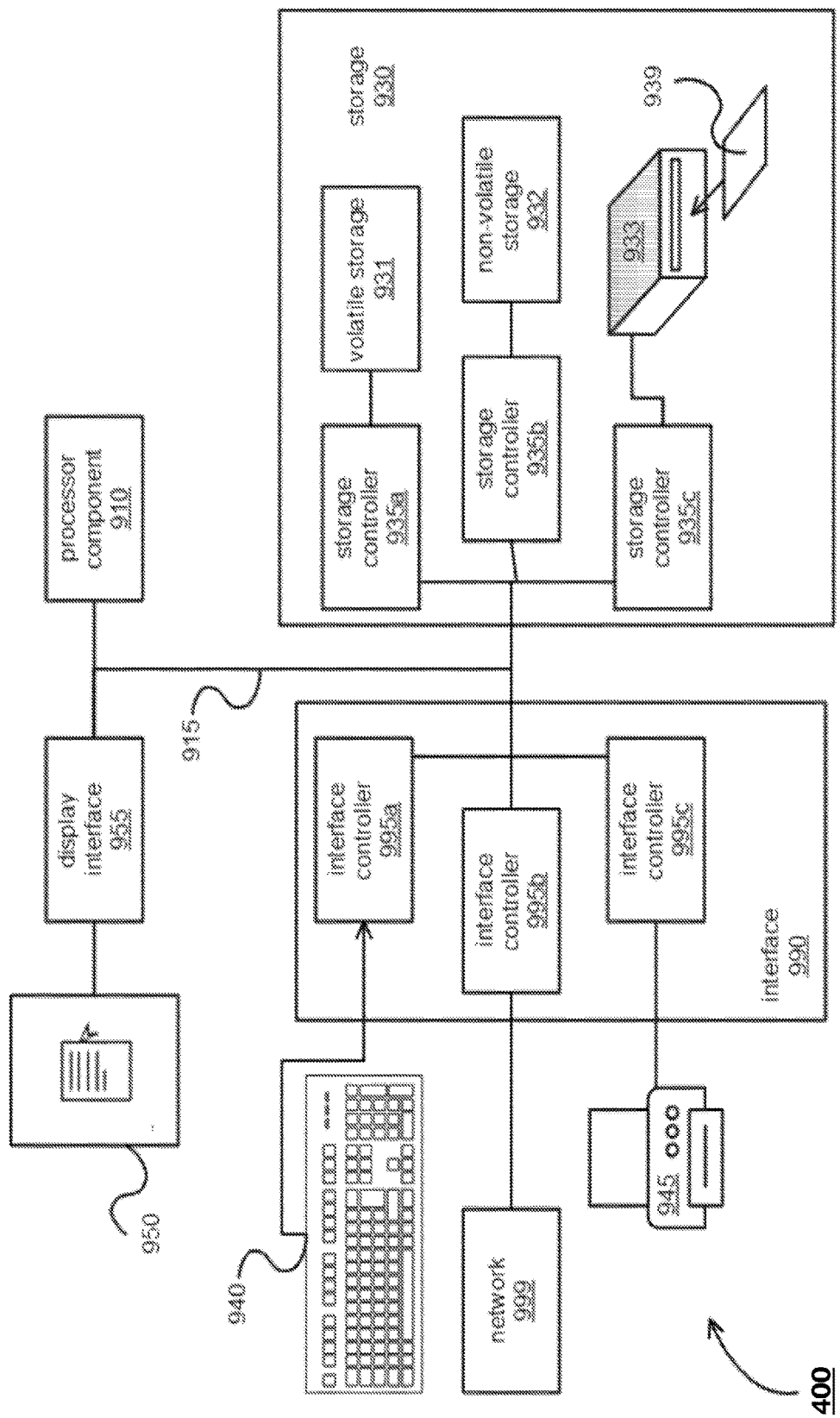
FIG. 16 illustrates a second example system.

FIG. 16 illustrates an example processing architecture 4000 suitable for implementing various embodiments as previously described. More specifically, the processing architecture 4000 (or variants thereof) may be implemented as part of a system including the system 100 or the of FIG. 1 or the system 800 of FIG. 8.

The processing architecture 4000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 4000, a computing device incorporates at least a processor element 910, a storage 930, an interface 990 to other devices, and coupling 915. Depending on various aspects of a computing device implementing the processing architecture 4000, including its intended use and/or conditions of use, such a computing device may further incorporate additional components, such as without limitation, a counter element 915.

The coupling 915 incorporates one or more buses, point-to-point interconnects, transceivers, buffers, crosspoint switches, and/or other conductors and/or logic that communicatively couples at least the processor element 910 to the storage 930. The coupling 915 may further couple the processor element 910 to one or more of the interface 990 and the display interface 955 (depending on which of these and/or other components are also present). With the processor element 910 being so coupled by couplings 915, the processor element 910 is able to perform the various ones of the tasks described at length, above, for whichever ones of the computing devices 100, 300 and 600 implement the processing architecture 4000. The coupling 915 may be implemented with any of a variety of technologies or combinations of technologies by which signals are optically and/or electrically conveyed. Further, at least portions of couplings 915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, Serial ATA (SATA) and the like.

As previously discussed, the processor element 910 may include any of a wide variety of commercially available processors, employing any of a wide variety of technologies and implemented with one or more cores physically combined in any of a number of ways.

As previously discussed, the storage 930 may include one or more distinct storage devices based on any of a wide variety of technologies or combinations of technologies. More specifically, as depicted, the storage 930 may include one or more of a volatile storage 931 (e.g., solid state storage based on one or more forms of RAM technology), a non-volatile storage 932 (e.g., solid state, ferromagnetic, phase change, or other storage not requiring a constant provision of electric power to preserve their contents), and a removable media storage 933 (e.g., removable disc or solid state memory card storage by which information may be conveyed between computing devices). This depiction of the storage 930 as possibly comprising multiple distinct types of storage is in recognition of the commonplace use of more than one type of storage device in computing devices in which one type provides relatively rapid reading and writing capabilities enabling more rapid manipulation of data by the processor element 910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935a providing an appropriate interface to the volatile storage 931 that perhaps employs row and column addressing, and where the storage controller 935a may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935b providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935c providing an appropriate interface to the removable media storage 933 that perhaps employs addressing of blocks of information, and where the storage controller 935c may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 940. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950, which may include the display stack 100 the display stack 200, or the like), such a computing device implementing the processing architecture 4000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the computing devices described herein may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The disclosure now turns to providing example implementations. These examples are given for clarity of presentation and not to be limiting.

Example 1

An apparatus, comprising: logic, at least a portion of which is implemented in hardware, the logic to: receive an image to be warped, the image comprising a plurality of pixels; warp at least one of the plurality of pixels based in part on an image warping field, the image warping field comprising a plurality of cells, each of the plurality of cells comprising at least one warping coefficient to warp ones of the plurality of pixels; and generate a pre-warped image based on the plurality of pixels warped based on the image warping field.

Example 2

The apparatus of example 1, the logic to: retrieve the at least one warping coefficient for a first cell of the image warping field; determine, for each of the plurality of pixels, ones of the plurality of pixels corresponding to the first cell; and warp each of the ones of the plurality of pixels corresponding to the first cell based on the retrieved at least one warping coefficient.

Example 3

The apparatus of example 2, the logic to: retrieve the at least one warping coefficient for a second cell of the image warping field; determine, for each of the plurality of pixels, ones of the plurality of pixels corresponding to the second cell; and warp each of the ones of the plurality of pixels corresponding to the second cell based on the retrieved at least one warping coefficient.

Example 4

The apparatus of example 1, the at least one warping coefficient for each of the plurality of cells a coefficient for a polynomial function.

Example 5

The apparatus of example 4, wherein the at least one coefficient for a first cell of the plurality of cells is different than the at least one coefficient for a second cell of the plurality of cells.

Example 6

The apparatus of example 4, wherein each of the plurality of cells comprise a plurality of warping coefficients.

Example 7

The apparatus of example 4, wherein each of the plurality of cells comprise between 2 and 10 warping coefficients.

Example 8

The apparatus of example 1, wherein the image warping field is a first image warping field and the pre-warped image is a first-pre-warped image, the logic to: warp each of the plurality of pixels based in part on a second image warping field, the second image warping field comprising a plurality of cells, each of the plurality of cells comprising at least one warping coefficient to warp the plurality of pixels; and generate a second pre-warped image based on the plurality of pixels warped based on the second image warping field.

Example 9

The apparatus of any one of examples 1 to 8, the logic comprising one or more registers to store the at least one warping coefficients.

Example 10

The apparatus of any one of example 1 to 8, the logic implemented in a field programmable gate array (FPGA) or an application specific integrated circuit (ASIC).

Example 11

A system comprising: a light source to emit light beams; a reflector to reflect the light beams to project an image; and logic, at least a portion of which is implemented in hardware, the logic to: receive a plurality of pixels corresponding to the image to be projected; warp each of the plurality of pixels based in part on an image warping field, the image warping field comprising a plurality of cells, each of the plurality of cells comprising at least one warping coefficient to warp ones of the plurality of pixels; and send a control signal to the light source to cause the light source to emit the light beams corresponding to the plurality of pixels warped based on the image warping field.

Example 12

The system of example 11, the logic to: retrieve the at least one warping coefficient for a first cell of the image warping field; determine, for each of the plurality of pixels, ones of the plurality of pixels corresponding to the first cell; and warp each of the ones of the plurality of pixels corresponding to the first cell based on the retrieved at least one warping coefficient.

Example 13

The system of example 12, the logic to: retrieve the at least one warping coefficient for a second cell of the image warping field; determine, for each of the plurality of pixels, ones of the plurality of pixels corresponding to the second cell; and warp each of the ones of the plurality of pixels corresponding to the second cell based on the retrieved at least one warping coefficient.

Example 14

The system of example 11, the at least one warping coefficient for each of the plurality of cells a coefficient for a polynomial function.

Example 15

The system of example 14, wherein the at least one coefficient for a first cell of the plurality of cells is different than the at least one coefficient for a second cell of the plurality of cells.

Example 16

The system of example 14, wherein each of the plurality of cells comprise a plurality of warping coefficients.

Example 17

The system of example 14, wherein each of the plurality of cells comprise between 2 and 10 warping coefficients.

Example 18

The system of example 11, wherein the image warping field is a first image warping field, the light source is a first light source, the light beams are first light beams, the system comprising a second light source to emit second light beams, the logic to: warp each of the plurality of pixels based in part on a second image warping field, the second image warping field comprising a plurality of cells, each of the plurality of cells comprising at least one warping coefficient to warp the plurality of pixels; and send a control signal to the second light source to cause the second light source to emit the second light beams corresponding to the plurality of pixels warped based on the second image warping field.

Example 19

The system of any one of examples 11 to 18, the logic comprising one or more registers to store the at least one warping coefficients.

Example 20

The system of any one of example 11 to 18, the logic implemented in a field programmable gate array (FPGA) or an application specific integrated circuit (ASIC).

Example 21

The system of any one of examples 11 to 18, the light source comprising at least one of a laser or a light emitting diode (LED).

Example 22

The system of any one of examples 11 to 18, the reflector comprising a microelectromechanical system (MEMS) mirror.

Example 23

The system of example 22, comprising a projection surface, the reflector to reflect the light beams across the projection surface to project the image.

Example 24

The system of example 23, the projection surface comprising a holographic optical element to reflect the projected image as a virtual image.

Example 25

A method comprising: receiving an image to be warped, the image comprising a plurality of pixels; warping each of the plurality of pixels based in part on an image warping field, the image warping field comprising a plurality of cells, each of the plurality of cells comprising at least one warping coefficient to warp ones of the plurality of pixels; and generating a pre-warped image based on the plurality of pixels warped based on the image warping field.

Example 26

The method of example 25, comprising: retrieving the at least one warping coefficient for a first cell of the image warping field; determining, for each of the plurality of pixels, ones of the plurality of pixels corresponding to the first cell; and warping each of the ones of the plurality of pixels corresponding to the first cell based on the retrieved at least one warping coefficient.

Example 27

The method of example 26, comprising: retrieving the at least one warping coefficient for a second cell of the image warping field; determining, for each of the plurality of pixels, ones of the plurality of pixels corresponding to the second cell; and warping each of the ones of the plurality of pixels corresponding to the second cell based on the retrieved at least one warping coefficient.

Example 28

The method of example 25, the at least one warping coefficient for each of the plurality of cells a coefficient for a polynomial function.

Example 29

The method of example 28, wherein the at least one coefficient for a first cell of the plurality of cells is different than the at least one coefficient for a second cell of the plurality of cells.

Example 30

The method of example 28, wherein each of the plurality of cells comprise a plurality of warping coefficients.

Example 31

The method of example 28, wherein each of the plurality of cells comprise between 2 and 10 warping coefficients.

Example 32

The method of example 25, wherein the image warping field is a first image warping field and the pre-warped image is a first-pre-warped image, the method comprising: warping each of the plurality of pixels based in part on a second image warping field, the second image warping field comprising a plurality of cells, each of the plurality of cells comprising at least one warping coefficient to warp the plurality of pixels; and generating a second pre-warped image based on the plurality of pixels warped based on the second image warping field.

Example 33

An apparatus for a device, the apparatus comprising means for performing the method of any one of examples 25 to 32.

Example 34

At least one machine-readable storage medium comprising instructions that when executed by a processing unit, cause the processing unit to: receive an image to be warped, the image comprising a plurality of pixels; warp each of the plurality of pixels based in part on an image warping field, the image warping field comprising a plurality of cells, each of the plurality of cells comprising at least one warping coefficient to warp ones of the plurality of pixels; and generate a pre-warped image based on the plurality of pixels warped based on the image warping field.

Example 35

The at least one machine-readable storage medium of example 34, comprising instructions that cause the processing unit to: retrieve the at least one warping coefficient for a first cell of the image warping field; determine, for each of the plurality of pixels, ones of the plurality of pixels corresponding to the first cell; and warp each of the ones of the plurality of pixels corresponding to the first cell based on the retrieved at least one warping coefficient.

Example 36

The at least one machine-readable storage medium of example 35, comprising instructions that cause the processing unit to: retrieve the at least one warping coefficient for a second cell of the image warping field; determine, for each of the plurality of pixels, ones of the plurality of pixels corresponding to the second cell; and warp each of the ones of the plurality of pixels corresponding to the second cell based on the retrieved at least one warping coefficient.

Example 37

The at least one machine-readable storage medium of example 34, the at least one warping coefficient for each of the plurality of cells a coefficient for a polynomial function.

Example 38

The at least one machine-readable storage medium of example 34, wherein the at least one coefficient for a first cell of the plurality of cells is different than the at least one coefficient for a second cell of the plurality of cells.

Example 39

The at least one machine-readable storage medium of example 38, wherein each of the plurality of cells comprise a plurality of warping coefficients.

Example 40

The at least one machine-readable storage medium of example 38, wherein each of the plurality of cells comprise between 2 and 10 warping coefficients.

Example 41

The at least one machine-readable storage medium of example 34, wherein the image warping field is a first image warping field and the pre-warped image is a first-pre-warped image, comprising instructions that cause the processing unit to: warp each of the plurality of pixels based in part on a second image warping field, the second image warping field comprising a plurality of cells, each of the plurality of cells comprising at least one warping coefficient to warp the plurality of pixels; and generate a second pre-warped image based on the plurality of pixels warped based on the second image warping field.

Example 42

An apparatus, comprising: logic, at least a portion of which is implemented in hardware, the logic to: partition a per pixel image warping map into a plurality of cells, the per pixel image warping map comprising a plurality of pixel movements, the plurality of pixel movements corresponding to pixels in an image to be warped, each of the plurality of cells corresponding to at least one of the plurality of pixel movements; and determine, for each cell, a polynomial approximation of the pixel movements corresponding to the cell.

Example 43

The apparatus of example 42, the logic to determine the polynomial approximation based on using a plurality of warping coefficients.

Example 44

The apparatus of example 43, the logic to determine the polynomial approximation based in part on application of a linear regression to the pixel movements.

Example 45

A method comprising: partitioning a per pixel image warping map into a plurality of cells, the per pixel image warping map comprising a plurality of pixel movements, the plurality of pixel movements corresponding to pixel in an image to be warped, each of the plurality of cells corresponding to at least one of the plurality of pixel movements; and determining, for each cell, a polynomial approximation of the pixel movements corresponding to the cell.

Example 46

The method of example 45, comprising determining the polynomial approximation based on using a plurality of warping coefficients.

Example 47

The method of example 46, comprising determining the polynomial approximation based in part on application of a linear regression to the pixel movements.

Example 48

An apparatus for a device, the apparatus comprising means for performing the method of any one of examples 45 to 47.

Example 49

At least one machine-readable storage medium comprising instructions that when executed by a processing unit, cause the processing unit to: partition a per pixel image warping map into a plurality of cells, the per pixel image warping map comprising a plurality of pixel movements, the plurality of pixel movements corresponding to pixel in an image to be warped, each of the plurality of cells corresponding to at least one of the plurality of pixel movements; and determine, for each cell, a polynomial approximation of the pixel movements corresponding to the cell.

Example 50

The at least one machine-readable storage medium of example 49, comprising instructions that cause the processing unit to determine the polynomial approximation based on using a plurality of warping coefficients.

Example 51

The at least one machine-readable storage medium of example 50, comprising instructions that cause the processing unit to determine the polynomial approximation based in part on application of a linear regression to the pixel movements.

The invention claimed is:

1. An apparatus, comprising:
   logic, at least a portion of which is implemented in hardware, the logic to:
   receive an image to be warped, the image comprising a plurality of pixels;
   generate an image warping field comprising a plurality of cells, each of the plurality of cells comprising at least one warping coefficient to warp ones of the plurality of pixels, wherein generating the image warping field comprises recursively:
   partitioning a per pixel image warping map into a plurality of cells corresponding to the plurality of cells in the image warping field, the per pixel image warping map comprising a plurality of pixel movements, the plurality of pixel movements corresponding to pixels in the image to be warped, each of the plurality of cells of the per pixel image warping map corresponding to at least one of the plurality of pixel movements; and
   determining, for each cell, the at least one warping coefficient approximating the pixel movements corresponding to the cell;
   until the at least one warping coefficient has an error rate below a threshold;
   warp at least one of the plurality of pixels based in part on an image warping field; and
   generate a pre-warped image based on the plurality of pixels warped based on the image warping field.

2. The apparatus of claim 1, the logic to:
   retrieve the at least one warping coefficient for a first cell of the image warping field;
   determine, for each of the plurality of pixels, ones of the plurality of pixels corresponding to the first cell;
   warp each of the ones of the plurality of pixels corresponding to the first cell based on the retrieved at least one warping coefficient;
   retrieve the at least one warping coefficient for a second cell of the image warping field;
   determine, for each of the plurality of pixels, ones of the plurality of pixels corresponding to the second cell; and
   warp each of the ones of the plurality of pixels corresponding to the second cell based on the retrieved at least one warping coefficient.

3. The apparatus of claim 1, the at least one warping coefficient for each of the plurality of cells is a coefficient for a polynomial function.

4. The apparatus of claim 3, wherein the at least one coefficient for a first cell of the plurality of cells is different than the at least one coefficient for a second cell of the plurality of cells, and wherein each of the plurality of cells comprise a plurality of warping coefficients.

5. The apparatus of claim 1, the logic to perform a depth first search to determine a number of cells to partition the per pixel image warping map into.

6. A method comprising:
   receiving an image to be warped, the image comprising a plurality of pixels;
   generating an image warping field comprising a plurality of cells, each of the plurality of cells comprising at least one warping coefficient to warp ones of the plurality of pixels, wherein generating the image warping field comprises recursively:
   partitioning a per pixel image warping map into a plurality of cells corresponding to the plurality of cells in the image warping field, the per pixel image warping map comprising a plurality of pixel movements, the plurality of pixel movements corresponding to pixels in the image to be warped, each of the plurality of cells of the per pixel image warping map corresponding to at least one of the plurality of pixel movements; and
   determining, for each cell, the at least one warping coefficient approximating the pixel movements corresponding to the cell;
   until the at least one warping coefficient has an error rate below a threshold;
   warping each of the plurality of pixels based in part on an image warping field; and
   generating a pre-warped image based on the plurality of pixels warped based on the image warping field.

7. The method of claim 6, comprising:
   retrieving the at least one warping coefficient for a first cell of the image warping field;
   determining, for each of the plurality of pixels, ones of the plurality of pixels corresponding to the first cell;
   warping each of the ones of the plurality of pixels corresponding to the first cell based on the retrieved at least one warping coefficient;
   retrieving the at least one warping coefficient for a second cell of the image warping field;
   determining, for each of the plurality of pixels, ones of the plurality of pixels corresponding to the second cell; and
   warping each of the ones of the plurality of pixels corresponding to the second cell based on the retrieved at least one warping coefficient.

8. The method of claim 7, the at least one warping coefficient for each of the plurality of cells is a coefficient for a polynomial function.

9. The method of claim 6, comprising performing a depth first search to determine a number of cells to partition the per pixel image warping map into.

10. At least one non-transitory machine-readable storage medium comprising instructions that when executed by a processing unit, cause the processing unit to recursively:
    partition a per pixel image warping map into a different plurality of cells for each recursion, the per pixel image warping map comprising a plurality of pixel movements, the plurality of pixel movements corresponding to pixels in an image to be warped, each of the plurality of cells corresponding to at least one of the plurality of pixel movements; and
    determine, for each cell, a polynomial approximation of the pixel movements corresponding to the cell;

until each polynomial approximation has an error rate below a threshold.

11. The at least one machine-readable storage medium of claim 10, comprising instructions that cause the processing unit to determine the polynomial approximation based on using a plurality of warping coefficients.

12. The at least one machine-readable storage medium of claim 11, comprising instructions that cause the processing unit to determine the polynomial approximation based in part on application of a linear regression to the pixel movements.

13. The at least one machine-readable storage medium of claim 10, comprising instructions that cause the processing unit to perform a depth first search to determine a number of cells to partition the per pixel image warping map into.

14. The at least one machine-readable storage medium of claim 13, wherein the instructions that cause the processing unit to perform a depth first search cause the processing unit to search between a range of cells to identify a range with the lowest error.

* * * * *